(12) United States Patent
Ludwig et al.

(10) Patent No.: US 11,557,939 B2
(45) Date of Patent: Jan. 17, 2023

(54) ELECTRIC DRIVE FOR A MOTOR VEHICLE

(71) Applicant: Brose Fahrzeugteile GmbH & Co. Kommanditgesellschaft, Würzburg, Würzburg (DE)

(72) Inventors: Kevin Ludwig, Würzburg (DE); Sebastien Labat, Schwanfeld (DE); Carsten Duppe, Kürnach (DE); Eugen Hermann, Großheirath (DE)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 462 days.

(21) Appl. No.: 16/626,739

(22) PCT Filed: Jun. 26, 2018

(86) PCT No.: PCT/EP2018/067064
§ 371 (c)(1),
(2) Date: Dec. 26, 2019

(87) PCT Pub. No.: WO2019/002266
PCT Pub. Date: Jan. 3, 2019

(65) Prior Publication Data
US 2020/0119616 A1 Apr. 16, 2020

(30) Foreign Application Priority Data
Jun. 26, 2017 (DE) ............... 10 2017 210 734.0

(51) Int. Cl.
*H02K 7/14* (2006.01)
*H02K 11/33* (2016.01)
*F01P 5/04* (2006.01)
*H02K 11/01* (2016.01)

(52) U.S. Cl.
CPC ............ *H02K 7/14* (2013.01); *F01P 5/04* (2013.01); *H02K 11/012* (2020.08);
(Continued)

(58) Field of Classification Search
CPC ...... H02K 7/14; H02K 11/012; H02K 11/014; H02K 11/33; H02K 1/2786; H02K 5/225;
(Continued)

(56) References Cited

U.S. PATENT DOCUMENTS 4,203,704 A * 5/1980 Saint-Amand ........... H02K 7/14
417/353
2003/0193264 A1* 10/2003 Pyntikov ................ H02K 11/33
310/68 D
(Continued)

FOREIGN PATENT DOCUMENTS

CN 2297818 Y 11/1998
CN 1596494 A 3/2005
(Continued)

*Primary Examiner* — Jacob M Amick
*Assistant Examiner* — Charles J Brauch
(74) *Attorney, Agent, or Firm* — Brooks Kushman, P.C.

(57) ABSTRACT

An electric drive for a motor vehicle, in particular a fan drive, comprising an electric motor that includes a rotor which is mounted on a motor shaft so as to be able to rotate about a stationary stator as well as a driving part which is coupled to the rotor, and at least one electroconductive cover part for influencing and/or blocking interfering electromagnetic fields generated during operation of the electric motor.

19 Claims, 16 Drawing Sheets

(52) U.S. Cl.
CPC ........... *H02K 11/014* (2020.08); *H02K 11/33* (2016.01); *F01P 2005/046* (2013.01); *F01P 2050/22* (2013.01)

(58) Field of Classification Search
CPC . H02K 21/16; H02K 21/22; F01P 5/04; F01P 2005/046; F01P 2050/22
See application file for complete search history.

(56) References Cited

U.S. PATENT DOCUMENTS

2016/0254731 A1* 9/2016 Roos .................... H02K 11/215
 310/43
2018/0166952 A1* 6/2018 Guigou ................ H02K 5/1735

FOREIGN PATENT DOCUMENTS

| | | |
|---|---|---|
| CN | 201559179 U | 8/2010 |
| CN | 203166702 U | 8/2013 |
| CN | 203871999 U | 10/2014 |
| CN | 105580254 A | 5/2016 |
| CN | 105720723 A | 6/2016 |
| CN | 106411037 A | 2/2017 |
| DE | 102007025232 A1 | 12/2008 |
| DE | 102010034563 A1 | 2/2012 |
| EP | 1050682 A2 | 11/2000 |
| EP | 2999097 A1 | 3/2016 |
| EP | 3125413 A1 | 2/2017 |
| FR | 3017434 A1 * 8/2015 ........... F16D 41/067 |
| FR | 3036889 A1 | 12/2016 |
| JP | 2686038 B2 | 12/1997 |

\* cited by examiner

ELECTRIC DRIVE FOR A MOTOR VEHICLE

CROSS-REFERENCE TO RELATED APPLICATIONS

This application is the U.S. National Phase of PCT Application No. PCT/EP2018/067064 filed on Jun. 26, 2018, which claims priority to German Patent Application No. 10 2017 210 734.0, filed on Jun. 26, 2017, the disclosures of which are hereby incorporated in their entirety by reference herein.

TECHNICAL FIELD

The present disclosure relates to an electric drive, such as a fan drive for use in a motor vehicle.

BACKGROUND

Motor vehicles having an internal combustion engine develop a considerable amount of heat during operation. To maintain the operating temperature of an engine or within an air-conditioning system, a coolant that must be cooled may be used. This is generally accomplished by cooling air passing over cooling fins, which are in thermal equilibrium with the coolant. Since, especially at low driving speeds, the relative wind is normally no longer sufficient for cooling, it is possible, for example, to secure a radiator cowl with an electric (electric-motor) drive on the radiator comprising the cooling fins, said drive generating an additional air flow, which is guided by the cowl body. For this purpose, the (fan) drive has an electric motor, which is coupled to a drive part, in particular to a fan impeller that generates the flow.

In conventional arrangements, the cowl body has a substantially round aperture, within which the fan drive is arranged. Here, the plane in which the fan impeller is situated is substantially parallel to the plane of the cooling fins. The electric motor coupled in terms of drive engineering to the fan impeller is fixed on a rigid holder at the end by means of screws or rivets, for example, and the holder is held in the center of the aperture by means of radially extending struts.

For this purpose, use is made, for example, of brushless electric motors, where a rotor mounted so as to be rotatable relative to a stator is driven by a rotating magnetic field. In this arrangement, phase windings of the rotor (rotating-field winding) are supplied with a corresponding electric three-phase or motor current, which is subject to open-loop and closed-loop control by means of a controller as part of (motor) electronics.

In the electric-motor mode, alternating currents are generated in the lines of the motor electronics and in the rotating-field winding owing to switchover processes. These alternating currents generate corresponding electromagnetic interference fields, which must be assessed as critical as regards compliance with EMC directives (electromagnetic compatibility).

SUMMARY

It is the underlying object of the present disclosure to provide a suitable electric drive for a motor vehicle. As one example, the object is to improve the drive in respect of the emission of electromagnetic interference fields during the operation of the electric motor. Another object may be to provide an electric motor suitable for a drive or for a fan device provided with a drive of this kind for a motor vehicle.

According to one or more embodiments, an electric drive according to the present disclosure is provided and designed for use in a motor vehicle and, in that context, especially as a fan drive, e.g. as an axial fan. For this purpose, the drive may include brushless electric motor with a rotor mounted on an axially oriented axis of rotation or motor axis in such a way as to be rotatable relative to a stationary stator. The rotor is may be coupled for conjoint rotation to a drive part, such as to a fan impeller. The electric motor may include a motor housing, which is pot-shaped for example, into which the stator and the rotor are inserted.

According to one or more embodiments, the electric motor has at least one electrically conductive cover part for influencing and/or blocking electromagnetic interference fields generated during the operation of the electric motor. In other words, the electromagnetic interference fields generated during operation are intercepted, damped, diverted or at least attenuated by means of the or of each cover part. The electromagnetic compatibility (EMC) of the electric drive is thereby improved. This is advantageous particularly in the case of an electric motor embodied as an external-rotor motor in uses as a fan drive.

The cover part according to one or more embodiments provides a low-cost, robust mechanical solution for compliance with EMC specifications, especially for fan drives, which is particularly easy to assemble. Moreover, the design and positioning of the or of each cover part enables the drive to be adapted flexibly to different uses.

In another embodiment, the cover part may be mounted on the motor housing, in particular in contact therewith. A particularly advantageous electric drive is thereby formed.

In another embodiment, the cover part may include a sleeve-type shell, which is mounted circumferentially on an outer motor part accommodating an inner motor part. In this context, a motor part should be interpreted to mean the stator and the rotor of the electric motor. In the case where the electric motor is embodied as an external-rotor electric motor, the stator forms the inner motor part, which is surrounded or enclosed by the rotor as the outer motor part. In this case, the sleeve-type cover part may be mounted on the outer circumference of the rotor. Where the electric motor is embodied as an internal-rotor motor, the rotor forms the inner motor part, which is inserted into the stator as the outer motor part. In this case, the sleeve-type cover part may be mounted on the outer circumference of the rotor in corresponding fashion. The cover part or shell thus fits around the outer circumference of the rotor or stator. Reliable EMC shielding during the operation of the electric motor is thus ensured by the shell. The shell may be produced or formed as a deep drawn part or as a rolled part, for example.

In one possible embodiment, the shell has radially inward-projecting beads for radial tolerance compensation relative to the respective motor part on its inner wall, for example, i.e. the shell surface facing the stator or the rotor in the assembled condition. Assembly is thereby significantly simplified. In the case of an internal-rotor electric motor, it is furthermore conceivable for the sleeve-type cover part mounted on the stator to be coupled in an electrically conductive manner to the yoke of a stator core assembly. An additional ground connection of the cover part, e.g. to a motor support, is thereby made possible, thereby making it possible to achieve a particularly high shielding potential.

In a suitable embodiment, the cover part may be disposed in an external-rotor motor. Here the cover part may be formed the shell, that may include a collar-side retaining rim, that may be oriented radially inward. The cover part or shell thus fits behind the rotor by means of the radially inward-bent retaining rim. In this case, the rotor is first of all inserted into the cover part in a suitable manner, whereupon the end region of the shell is bent radially inward to form the retaining rim. In other words, the retaining rim fits positively behind the rotor, thus ensuring that the cover part surrounds the rotor in an operationally reliable manner. Thus, the rotor is secured against accidentally sliding out of the cover part.

In an alternative embodiment, it is conceivable, for example, for the shell to have a number of radially inward-bent retaining tabs, by means of which the shell can be secured on the collar side on one end of the electric motor. In other words, the retaining rim is of segmented design in the form of a number of retaining tabs, which may be secured by screws on the rotor or on a return pot or end shield in the assembled condition.

In an advantageous development, the cover part is of at least substantially pot-type design. In this case, the cover part may include a pot base at the end and the circumferential (pot) shell, and the rotor may be inserted partially or fully into the cover part. In this case, the electric motor is suitably configured as an external-rotor motor. The pot base and the pot shell are joined to one another, e.g. the retaining rim of the shell fits over at least some section of the pot base. In a suitable development, the pot base and the pot shell may be formed of a one-piece design, i.e. are designed as a single part or so as to be monolithic with one another. The blocking of the interference fields generated during the operation of the electric motor is may be improved.

In a suitable development, a pot-type or pot-shaped cover part, into which the rotor is inserted, is thus provided. The cover part may be coupled to the rotor for conjoint rotation therewith. This means that the cover part rotates with the rotor during rotation of the latter. In other words, in this development the cover part is configured as a rotor cover or as an EMC pot. In respect of EMC, the rotor cover has a particularly high shielding potential, thereby making possible reliable blocking of the interference fields of the rotating-field winding of the rotor which are generated during the operation of the electric motor. In particular, the pot base is mounted on the rotor in a manner oriented toward the drive part. Reliable EMC shielding during electric-motor operation of the drive is thereby achieved.

In one or more embodiments, the pot base has a central annular region, from which radially oriented struts (radial struts) extend to the pot base. By virtue of the apertures formed between the struts, an air flow to the rotor and thus reliable and structurally simple cooling of the rotating-field windings of the rotor is made possible during operation. In addition or as an alternative, the annular region has further apertures to improve ventilation.

According to another embodiment, an annular cover part may be provided, that may cover the rotating-field winding of the stator partially or fully at the end. The blocking and/or influencing of the interference fields at the end, in particular, is thereby further improved.

In another embodiment, radially inward-oriented and axially angled tabs—i.e. tabs bent over in the axial direction—may be formed integrally in the region of the central annular opening in the cover part. As one example, the angular tabs are, in particular, secured on the stator. In other words, the cover part in this embodiment is fixed with respect to the housing or secured statically as a stator shield. As a result, the cover part does not have a disadvantageous effect on a balancing quality of the electric motor. In this case, the angular tabs are suitably secured at fastening points on the stator. This means that the existing fastening possibilities, by means of which the stator is secured in the motor housing, are used to secure the angular tabs. There is thus no disadvantageous effect on the existing installation space in the motor housing.

In one suitable embodiment, the or each cover part is inserted into the motor housing of the electric motor, said motor housing being of the pole pot type or in the form of a pole pot, for example. The EMC of the electric drive is thereby further improved.

An additional or further aspect of the invention provides a disk-shaped cover part, which is mounted on a hub of the drive part. In other words, the cover part is mounted on the impeller hub of a fan impeller and secured thereon, for example. This means that the cover part configured as a hub cover preferably rotates with the driven drive part. As a result, blocking and/or influencing of the electromagnetic interference fields generated during operation are/is further improved. Furthermore, the cover part in this embodiment has a particularly simple component geometry. This is advantageously then translated into the production and assembly costs.

The electric motor According to one or more embodiments is suitable and designed for the drive described above. In particular, the electric motor has one or more cover parts to improve the EMC properties.

In one preferred use, the electric drive described above is part of a fan device of a motor vehicle. In this case, the drive has a fan impeller as a drive part, and the disk-shaped cover part is mounted on the hub of the fan impeller.

BRIEF DESCRIPTION OF THE DRAWINGS

Illustrative embodiments of the invention are explained in greater detail below with reference to a drawing. In the drawing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In all the figures, corresponding parts and sizes are in all cases provided with the same reference signs.

Figure 1:
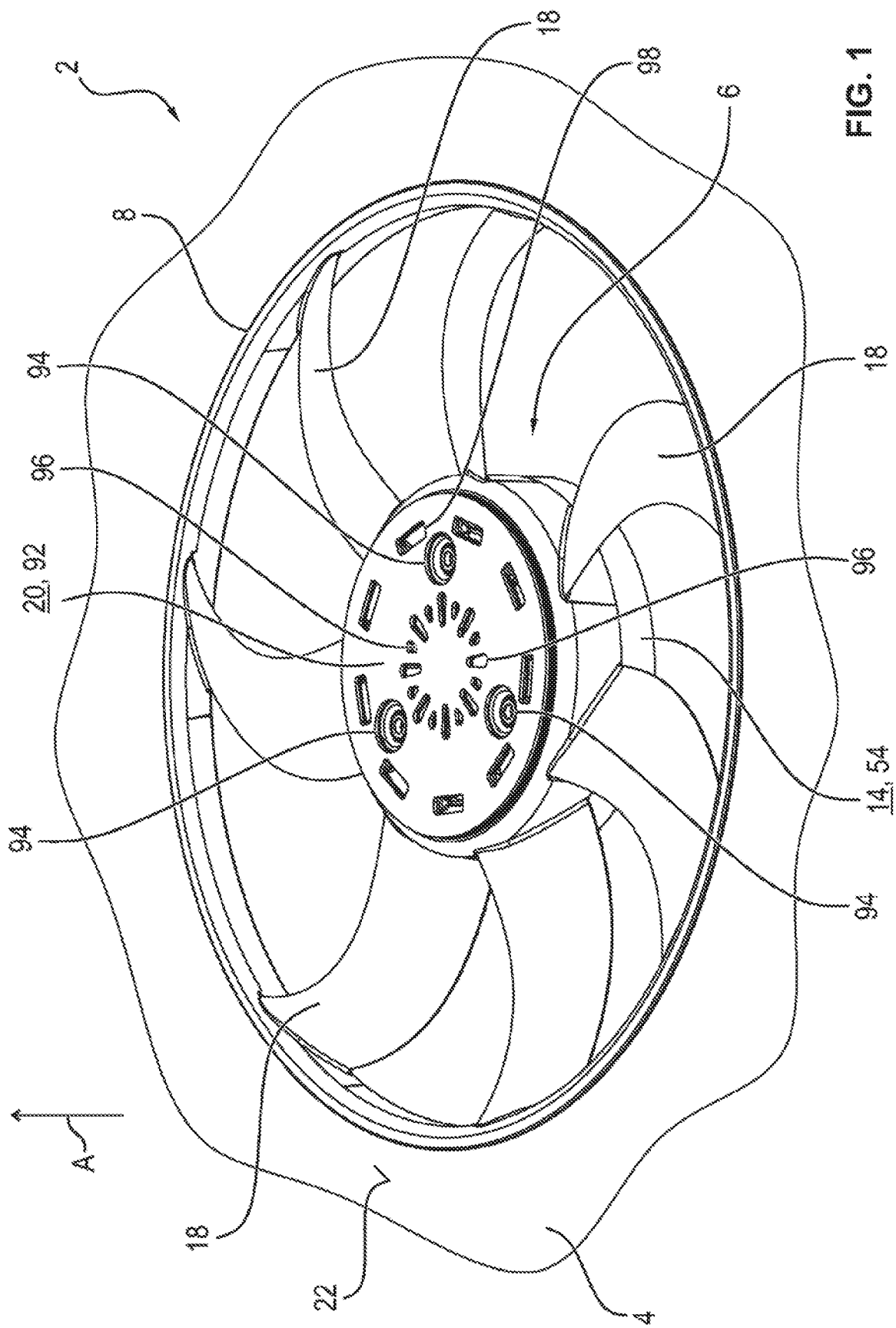
FIG. 1 shows, in perspective, a segment of a radiator cowl with a fan having an electric drive.

FIG. 1 shows, in perspective, a segment of a radiator cowl 2 having a cowl body 4 and a partially illustrated fan device (fan) 6 of a motor vehicle (not shown specifically). The cowl body 4 has an aperture 8, within which the fan 6 is arranged.

The fan 6, which is configured as an axial fan, may include an electric (fan) drive 10 (FIG. 2) with a drive part 12 designed as a fan impeller and an electric or fan motor 14 coupled thereto in terms of drive. The electric motor 14 may define a motor axis 16, which extends along an axial direction A of the substantially cylindrical electric motor 14 and vertically intersects the center of the drive part 12 and thus forms the axis of rotation D thereof.

In one or more embodiments, illustrated in FIG. 1, the drive part or fan impeller 12 may include seven (fan) blades 18, which are provided with reference signs purely by way of example. In this case, the blades 18 are formed integrally in a radial orientation on a central (impeller) hub 20. The fan impeller 12, that is to say, in particular, the hub 20 and the blades 18, are manufactured in one piece or monolithically or as a single part from a plastics material such as polyamide (PA), for example. The blades 18 are configured in such a way that an air flow through the aperture 8 is generated by a rotary motion of the fan impeller 12 about its axis of rotation D. In this case, the aperture 8 is approximately cylindrical, and the fan impeller 12 may be aligned with an upper side 22 of the cowl body 4 in the assembled condition.

Figure 2:
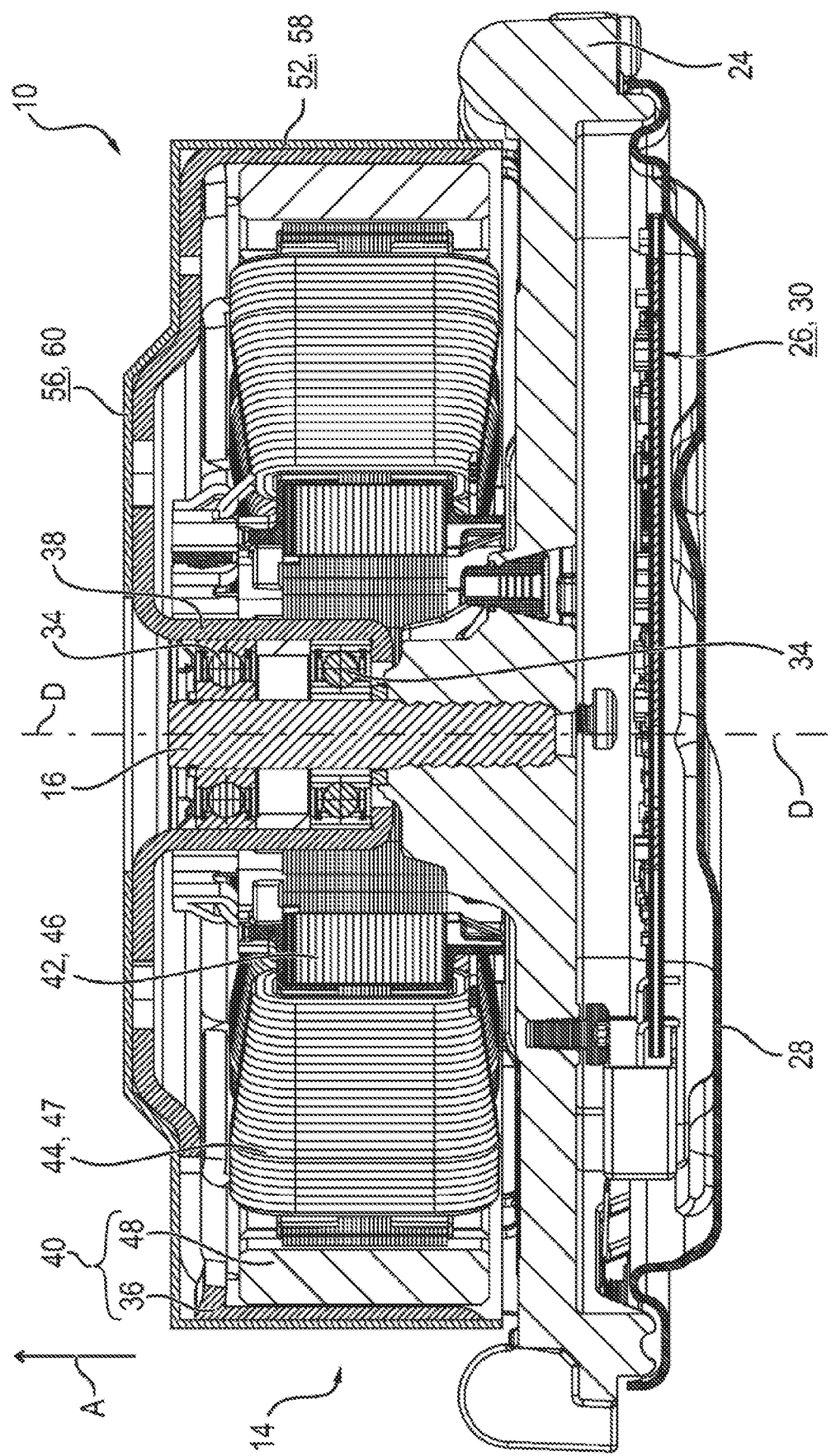
FIG. 2 shows a sectional illustration of the drive with an electric motor comprising a stator and a rotor and with a pot-type rotor cover mounted on the rotor.

In FIG. 2, the drive 10 is illustrated by means of a sectional illustration. The drive 10 comprises a motor support 24, which holds the electric motor 14 and has an electronics housing 28 accommodating motor electronics 26. The motor electronics 26 have an inverter circuit 30 with at least one capacitor 32 (FIG. 11), for example.

Two rolling bearings 34, which are configured as ball bearings for example, are used to support a return pot (rotor housing) 36 on the motor axis 16 in a manner which allows rotation around the axis of rotation D. The return pot 36 has a deep-drawn bearing receptacle 38, in which the rolling bearings 24 are arranged in a manner spaced apart axially.

The drive 10 furthermore may include a rotor 40, which is rotatably mounted on the motor axis 16. The electric motor 14 is embodied as a brushless DC motor having a central stator 42. In this illustrative embodiment, the electric motor 14 is embodied, in particular, as an external-rotor motor, and a rotating-field winding 44 that can be supplied with power by means of the inverter circuit 30 is mounted on a number of radially oriented stator teeth 46 (FIG. 13) of a core assembly of the stator 42. The rotating-field winding 44 is mounted in the form of individual coils, for example, on the individual stator teeth 46. In this arrangement, the rotor 40 is fitted with a number of permanent magnets 48, which are arranged on the inner circumference of the return pot 36.

Figure 13:
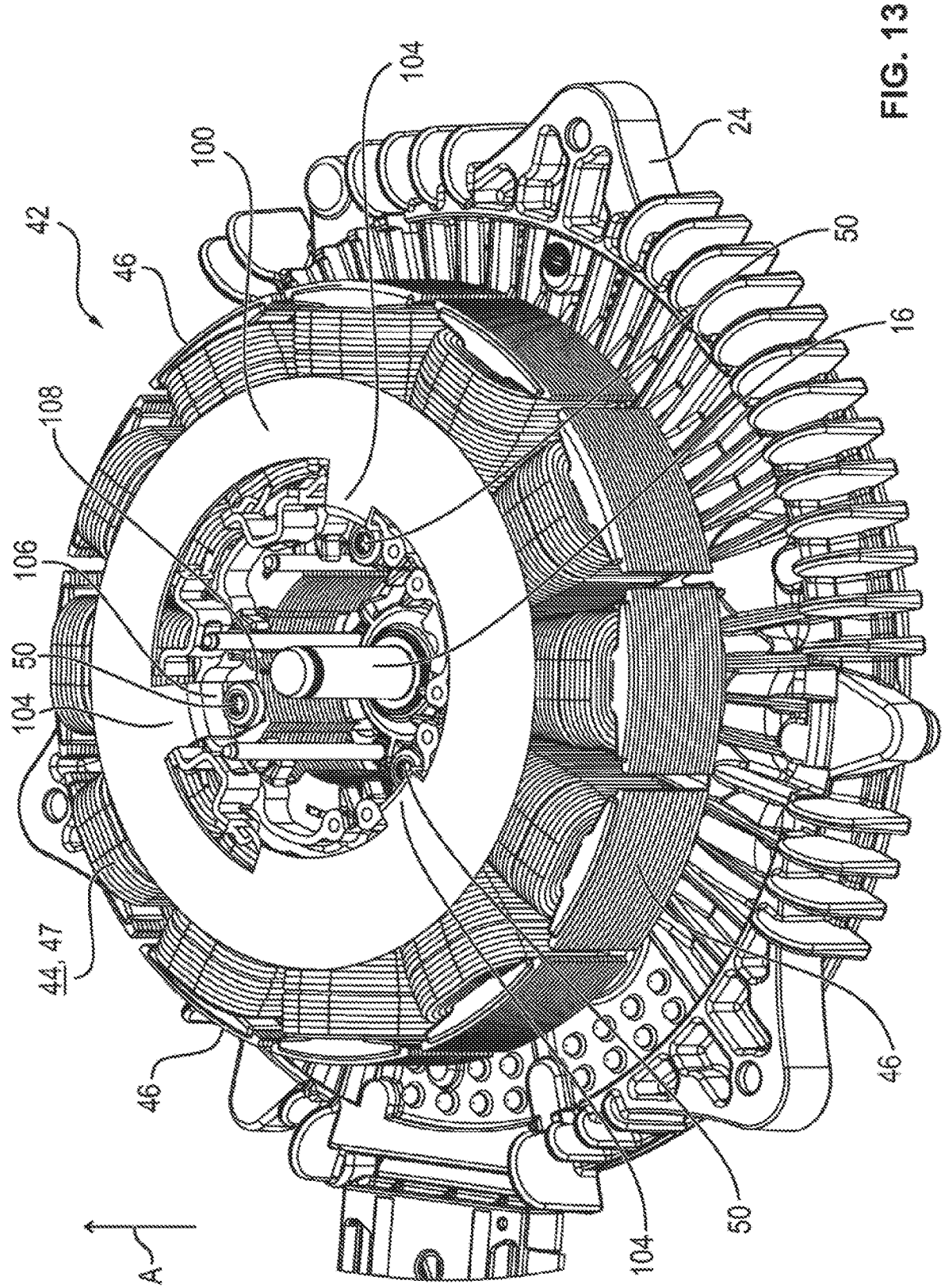
FIG. 13 shows, in perspective, the stator cover in a state mounted on the electric motor.
Figure 14:
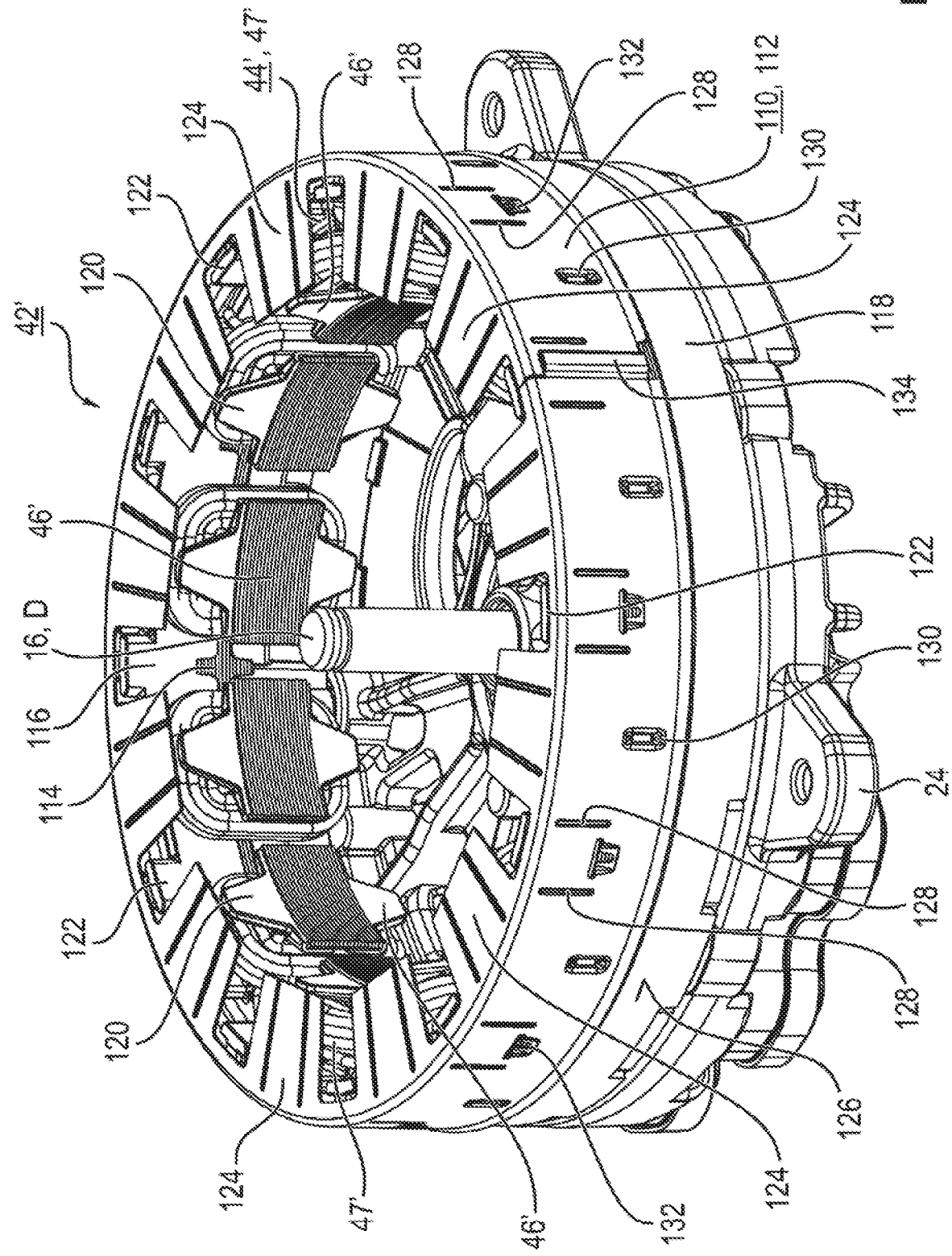
FIG. 14 shows, in perspective, a stator of an internal-rotor motor having a sleeve-type stator shell are arranged on the outer circumference.
Figure 15:
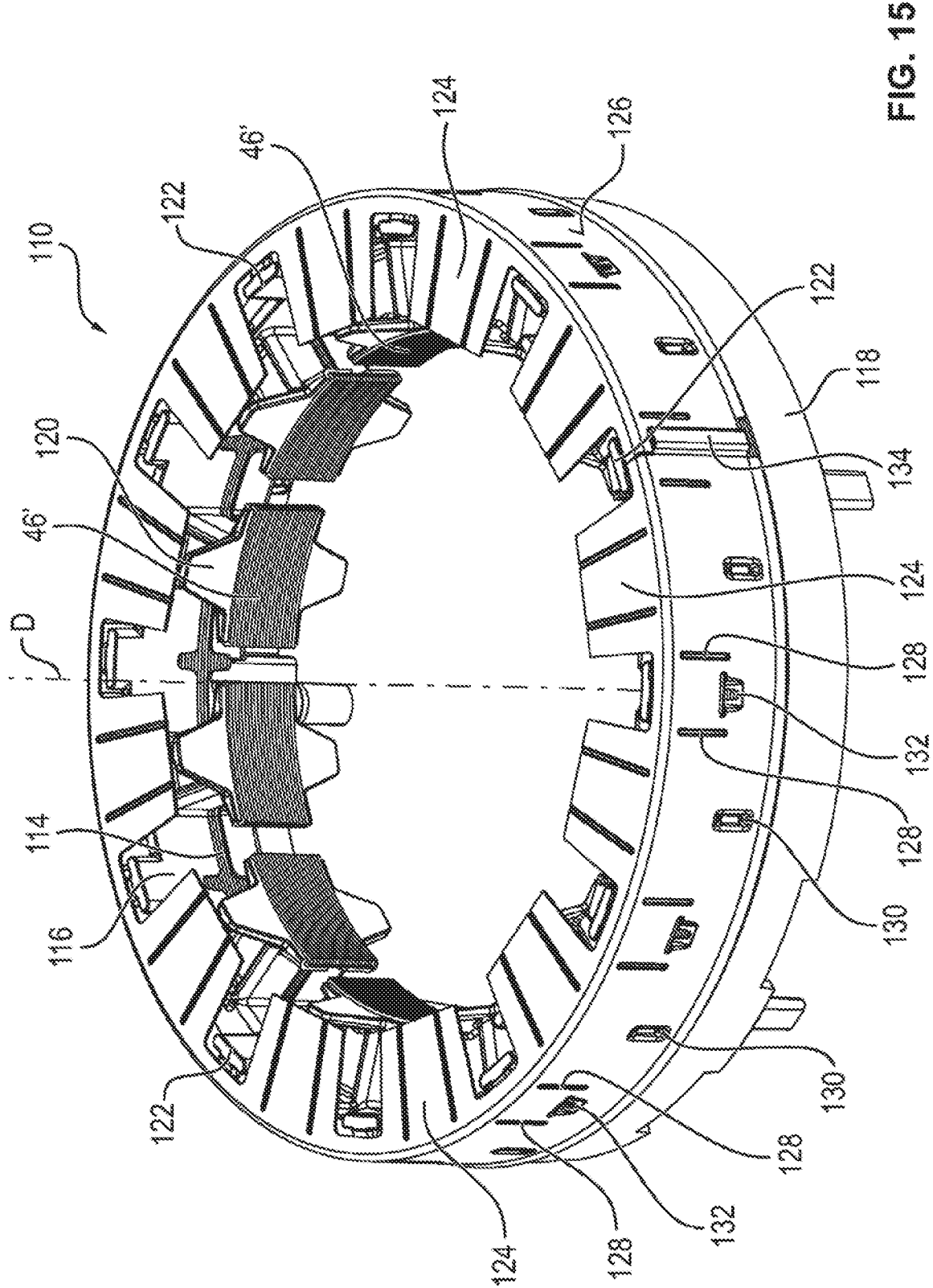
FIG. 15 shows the stator shell and the stator in perspective.

In this case, the stator 42 is secured on the motor support 24 in a manner fixed with respect to the housing by means of axial fastening screws 50 (FIG. 13). The rotor 40 is formed substantially by the return pot 36 and the permanent magnets 48 arranged on the inner circumference thereof.

In the illustrative embodiment illustrated in FIG. 2, a pot-type rotor cover is mounted on the return pot 36 as a cover part 52. Here, the cover part 52 is coupled firmly to the rotor 40 or the return pot 36, ensuring that it is taken along in rotation during the operation of the electric motor. In the assembled condition, the rotor cover 52 is accommodated within a motor housing 54—indicated only schematically in FIG. 1—of the electric motor 14, for example.

Figure 3:
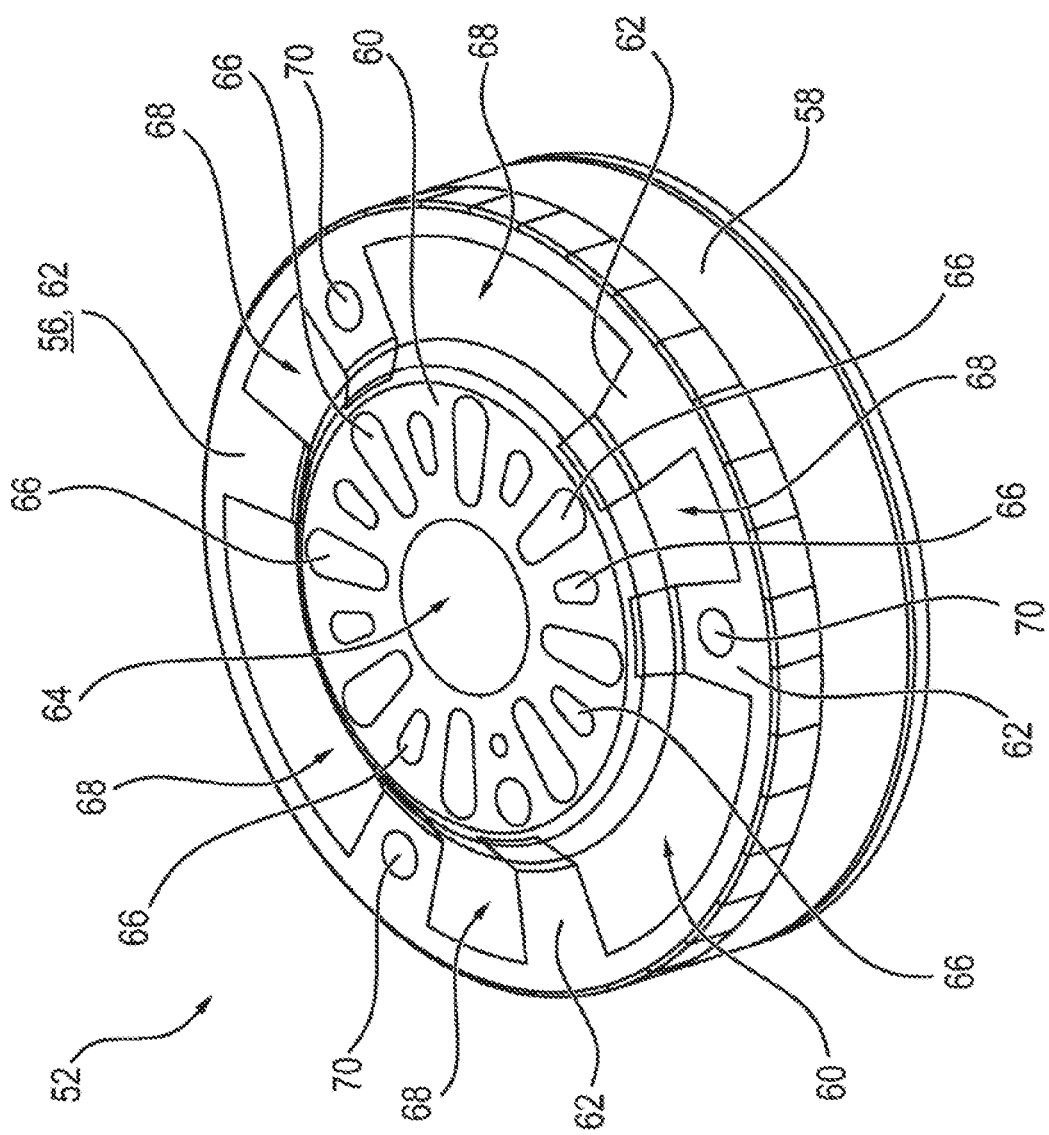
FIG. 3 shows the rotor cover in perspective.

The rotor cover 52 illustrated separately in FIG. 3 is produced from an electrically conductive material, in particular a metal material. The rotor cover 52 may include a pot base 56 at the end and a circumferential (pot) shell 58.

Here, the pot base 56 has an axially projecting annular region 60, on which six radially oriented struts (radial struts) 62 leading to the pot shell 58 are formed integrally on the circumference in respective pairs. In FIG. 3, purely by way of example, the radial struts 62 are provided with reference signs.

The annular region 60 has a central annular opening 64 and a number of ventilation openings 64, which surround the latter and, purely by way of example, are provided with reference signs. The ventilation openings 64 are introduced as radially oriented apertures or slotted holes into the pot base 56 or into the annular region 60. Moreover, further ventilation openings 68 for cooling the rotating-field winding 44 and the motor electronics 26 are provided by means of the apertures created between the radial struts 62.

Fastening holes 70, by means of which the pot base 56 and thus the pot-type or pot-shaped rotor cover 52 can be secured in a mechanically rigid manner on the return pot 36 or the rotor 40, are introduced into three of the radial struts 62.

By means of the rotor cover 52, particularly effective blocking of the interference fields of the rotor 40 which are generated during the operation of the electric motor is achieved, thereby improving the drive 10 in respect of its electromagnetic compatibility (EMC).

Figure 4:
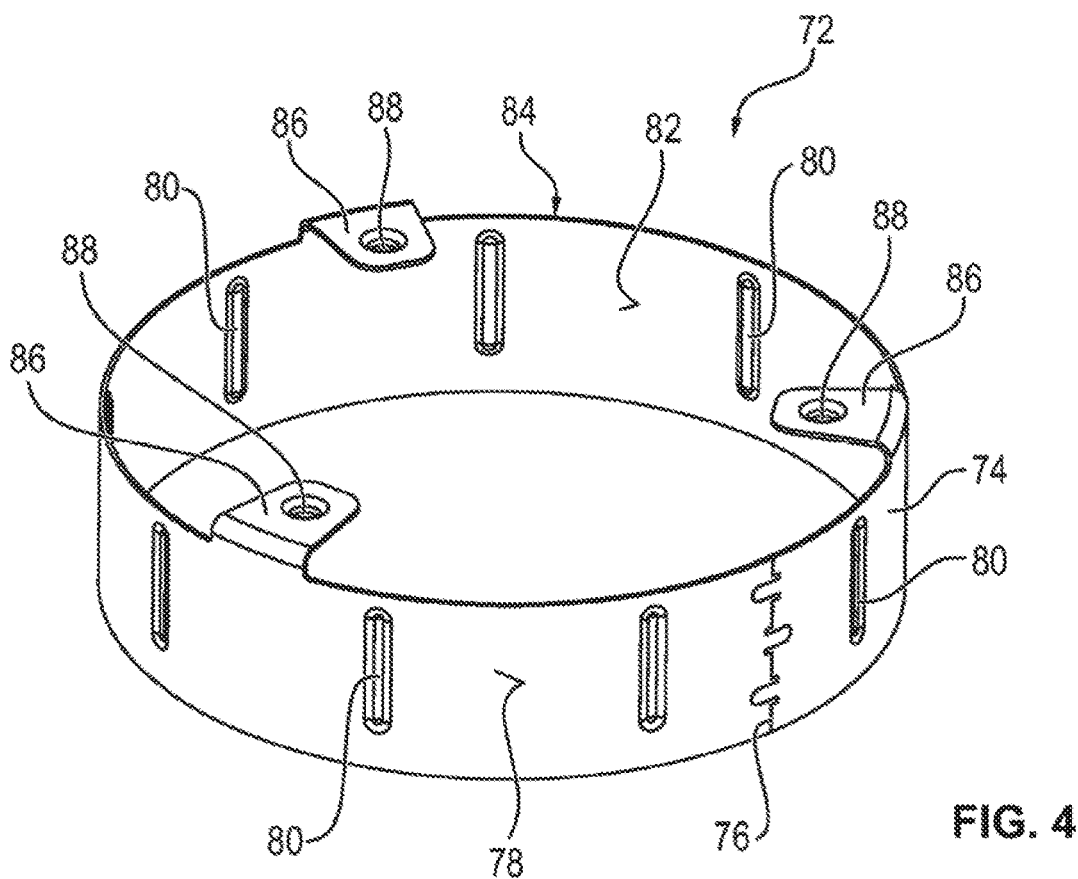
FIG. 4 shows, in perspective, a sleeve-type rotor shell with radially inward-projecting retaining tabs.
Figure 5:
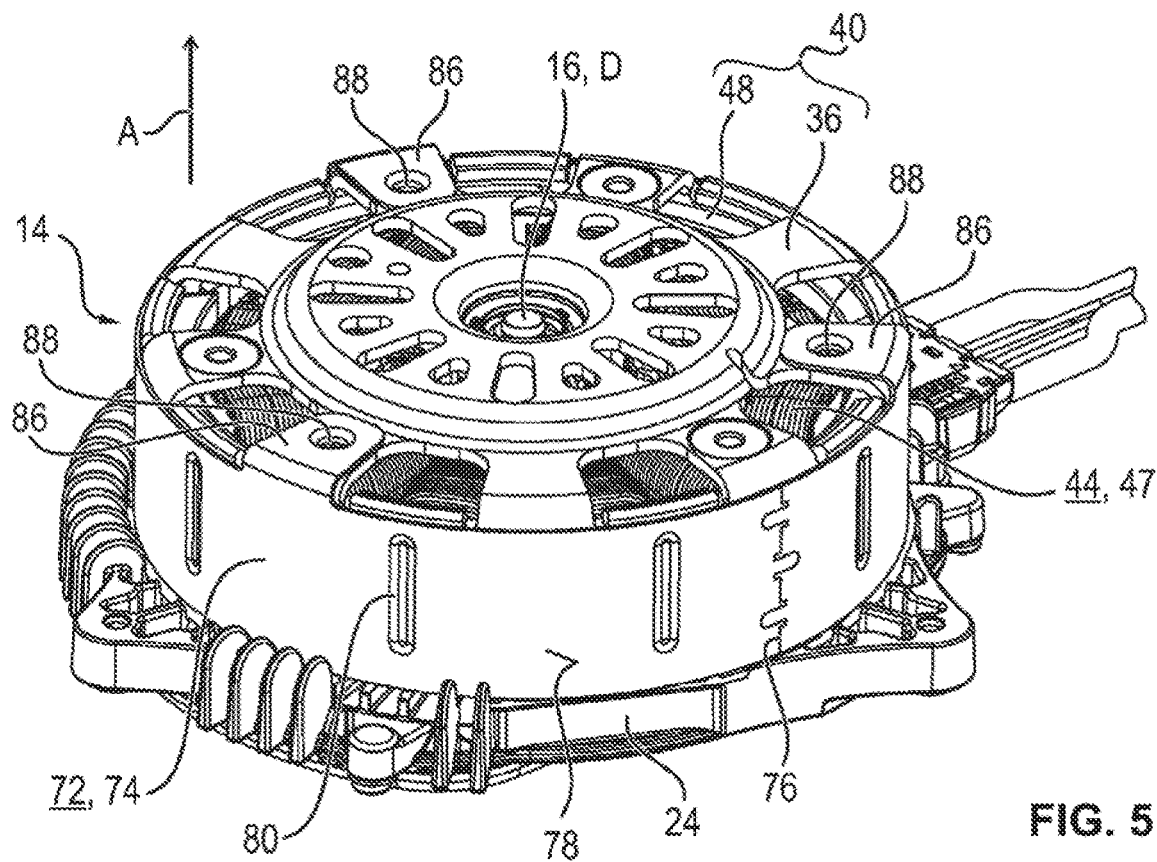
FIG. 5 shows, in perspective, the electric motor with the rotor shell secured thereon.

FIGS. 4 and 5 illustrate a sleeve-type or sleeve-shaped cover part 72. The cover part 72, which is also referred to below as a rotor sleeve, has a (sleeve, rotor) shell 74, which is mounted on the outer circumference of the rotor 40 or of the return pot 36 in the assembled condition (FIG. 5). The shell 74 is formed from a rolled or bent strip-shaped sheet-metal part, and the opposite ends of the sheet-metal part are joined together at a seam 76 to form the annular shell 74.

Nine beads 80 distributed over the circumference, which project radially into the opening in the rotor sleeve 72 on the shell inner surface 82 facing the rotor 40, are introduced into the shell outer surface 78 of the shell 74 which faces away from the rotor 40. The beads 80 serve to compensate for the radial clearance or for radial tolerance compensation between the rotor sleeve 72 and the outer circumference of the rotor 40. In the figures, purely by way of example, the beads 80 are provided with reference signs.

On an upper collar 84, that is to say the end facing the drive part 12 in the assembled condition, the shell 74 of the rotor sleeve 72 has three circumferentially distributed retaining tabs 86, which are bent radially inward. Each retaining tab 86 is provided with a fastening opening 88.

FIG. 5 shows the rotor sleeve 72 in the state mounted on the rotor 40. Here, the retaining tabs 86 are arranged in alignment with corresponding spokes or struts of the rotor or return pot end, thus enabling the rotor sleeve 72 to be secured for conjoint rotation on the end.

Figure 6:
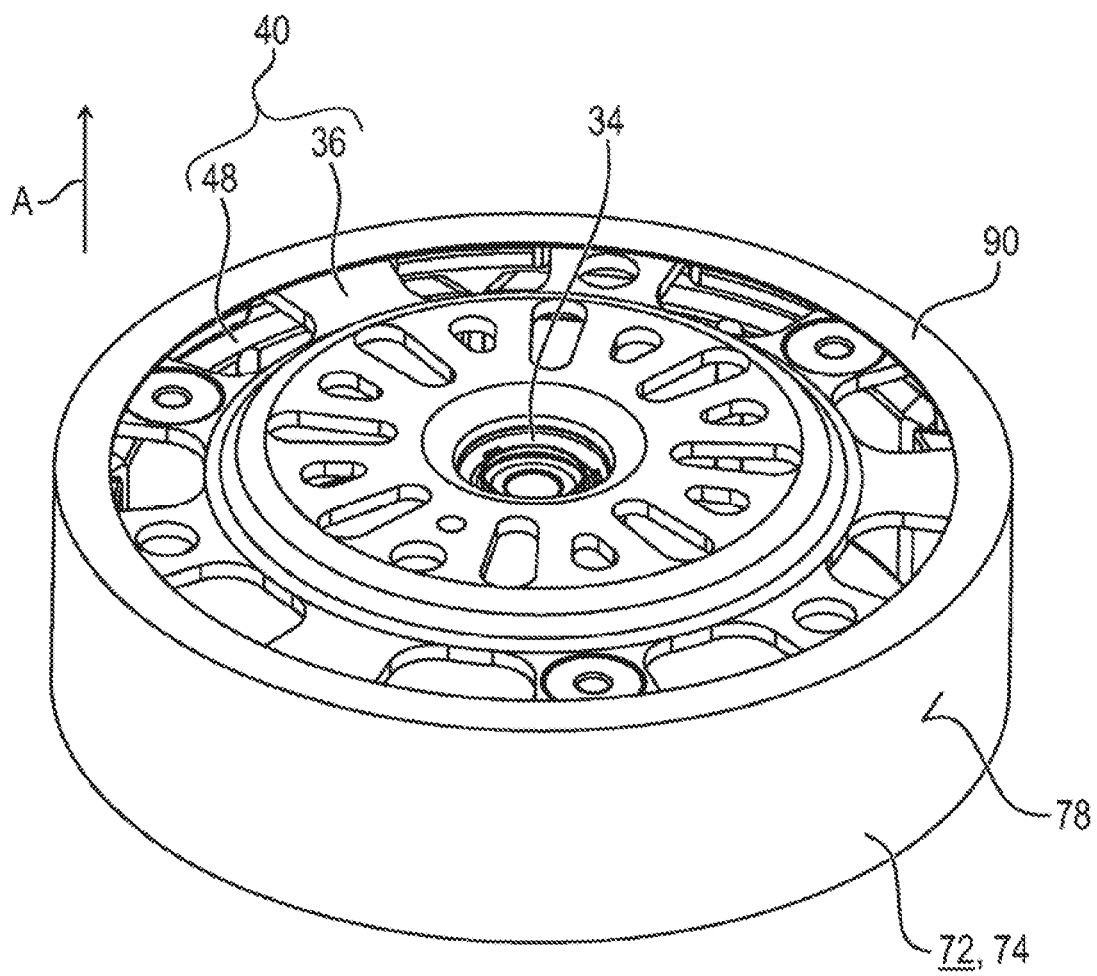
FIG. 6 shows, in perspective, the rotor with a shell having a collar-side retaining rim in a first embodiment.
Figure 7:
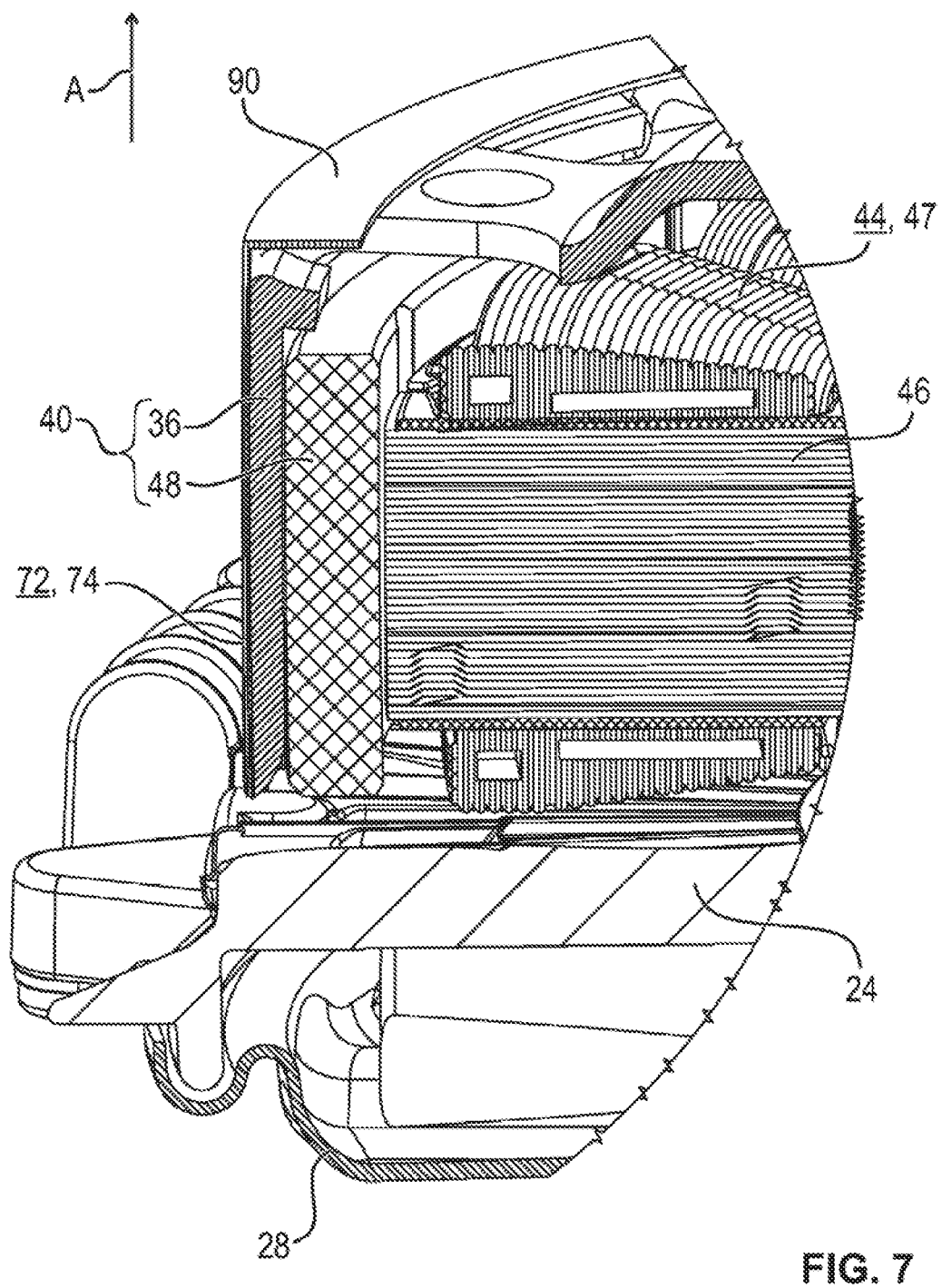
FIG. 7 shows a sectional illustration of a segment of the retaining rim of the shell in the first embodiment.

A first embodiment of the rotor sleeve 72 is illustrated as a segment and schematically below by means of FIG. 6 and FIG. 7.

In this illustrative embodiment, the rotor sleeve 72 does not have any retaining tabs 86, but instead has a collar-side retaining rim 90, which is bent radially inward. Here, as can be seen especially in the sectional illustration in FIG. 7, the retaining rim 90 fits circumferentially behind the end of the rotor 40 or of the return pot 36 at the end. In this embodiment, the retaining rim 90 is formed integrally, in particular on the drive-part side.

In an alternative embodiment of the rotor cover 52, it is conceivable, for example, for the (pot) shell 54 to have a corresponding retaining rim 90, which fits behind the pot base 56.

Figure 8:
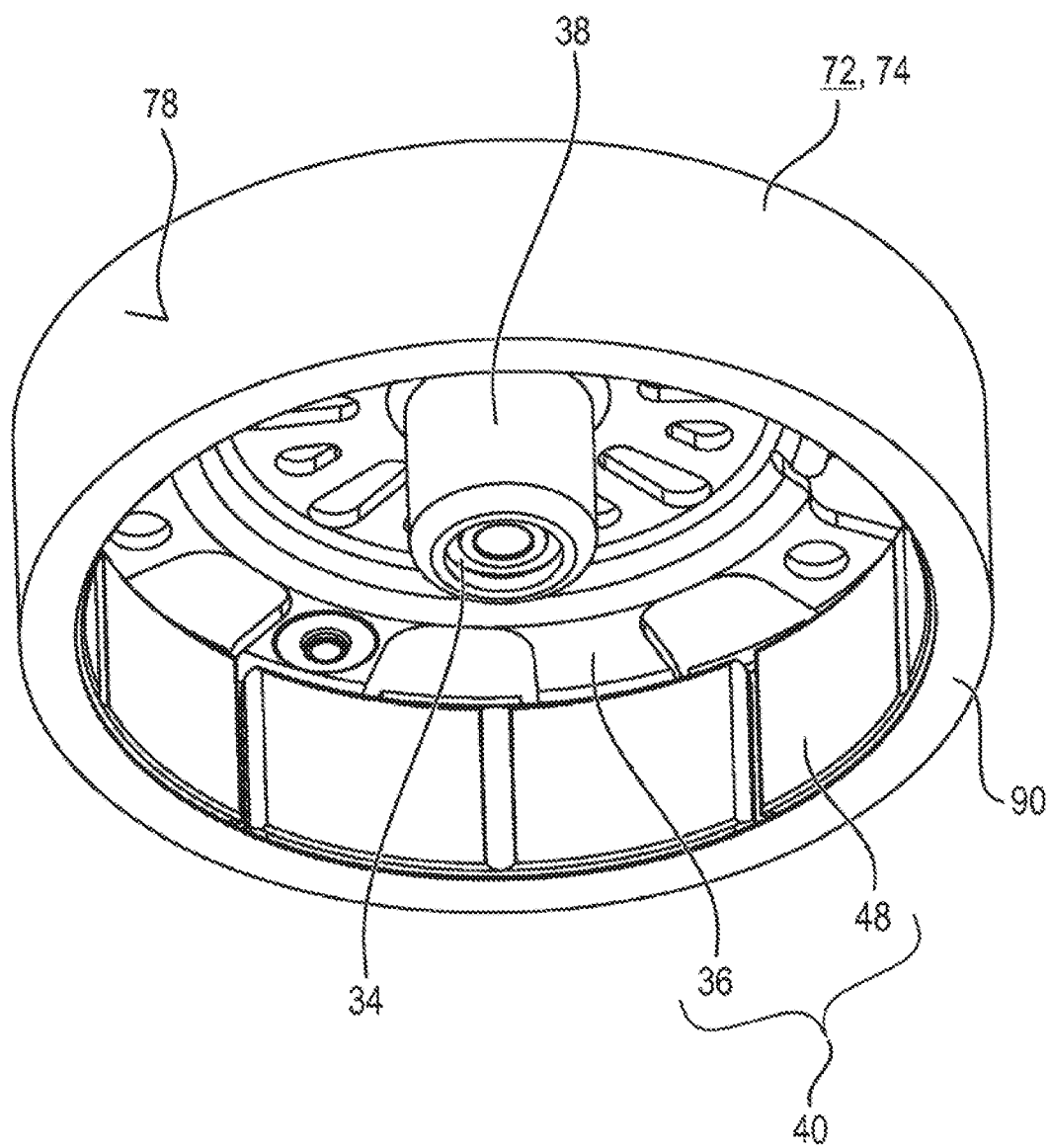
FIG. 8 shows, in perspective, the rotor with a shell having a collar-side retaining rim in a second embodiment.
Figure 9:
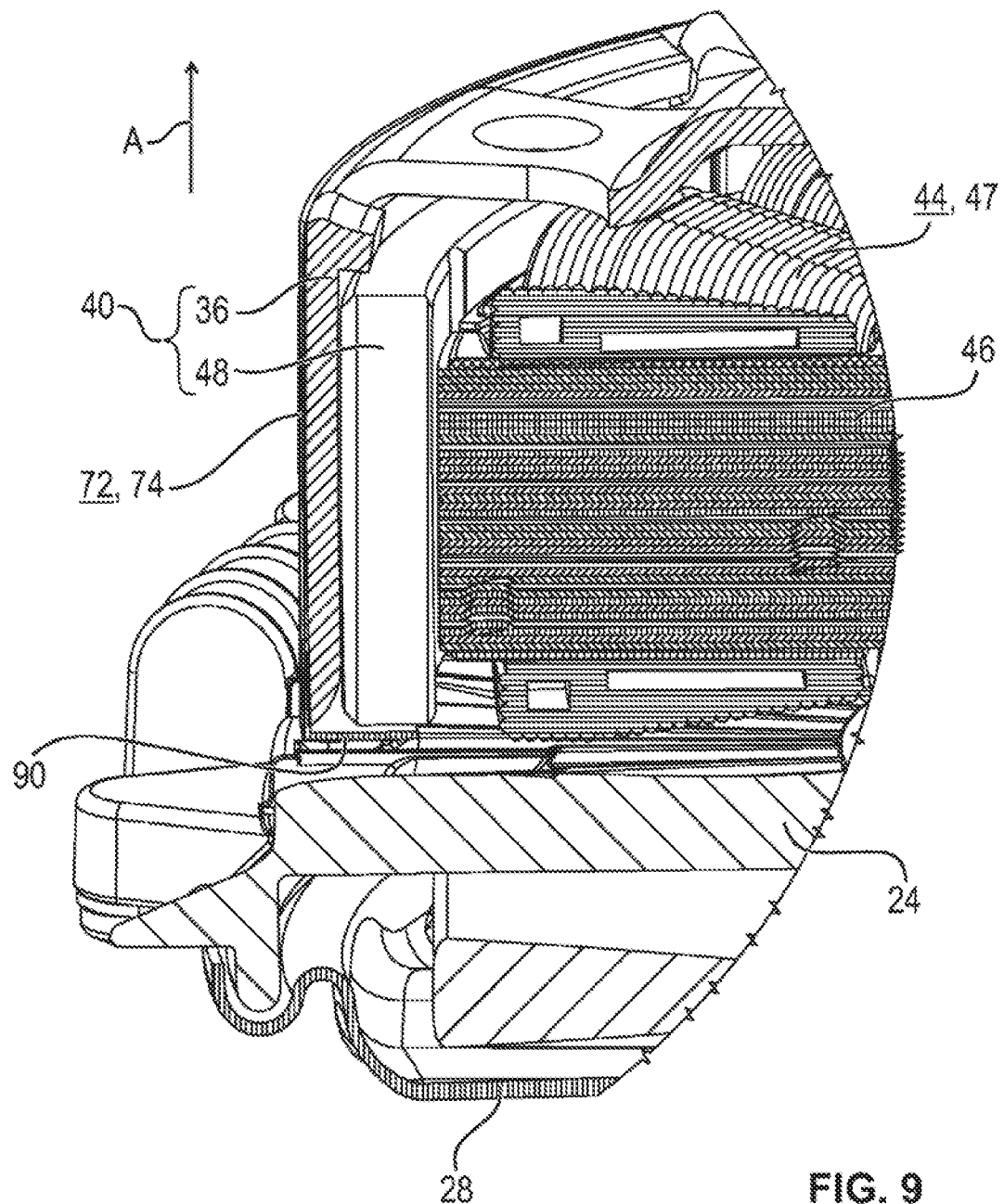
FIG. 9 shows a sectional illustration of a segment of the retaining rim of the rotor cover in the second embodiment.

In the illustrative embodiment in FIGS. 8 and 9, the retaining rim 90 of the shell 74 is formed integrally on the opposite end, i.e. toward the motor support 24. In other words, it fits behind the rotor 40 or the return pot 36 at the same end as the electronics.

Figure 10:
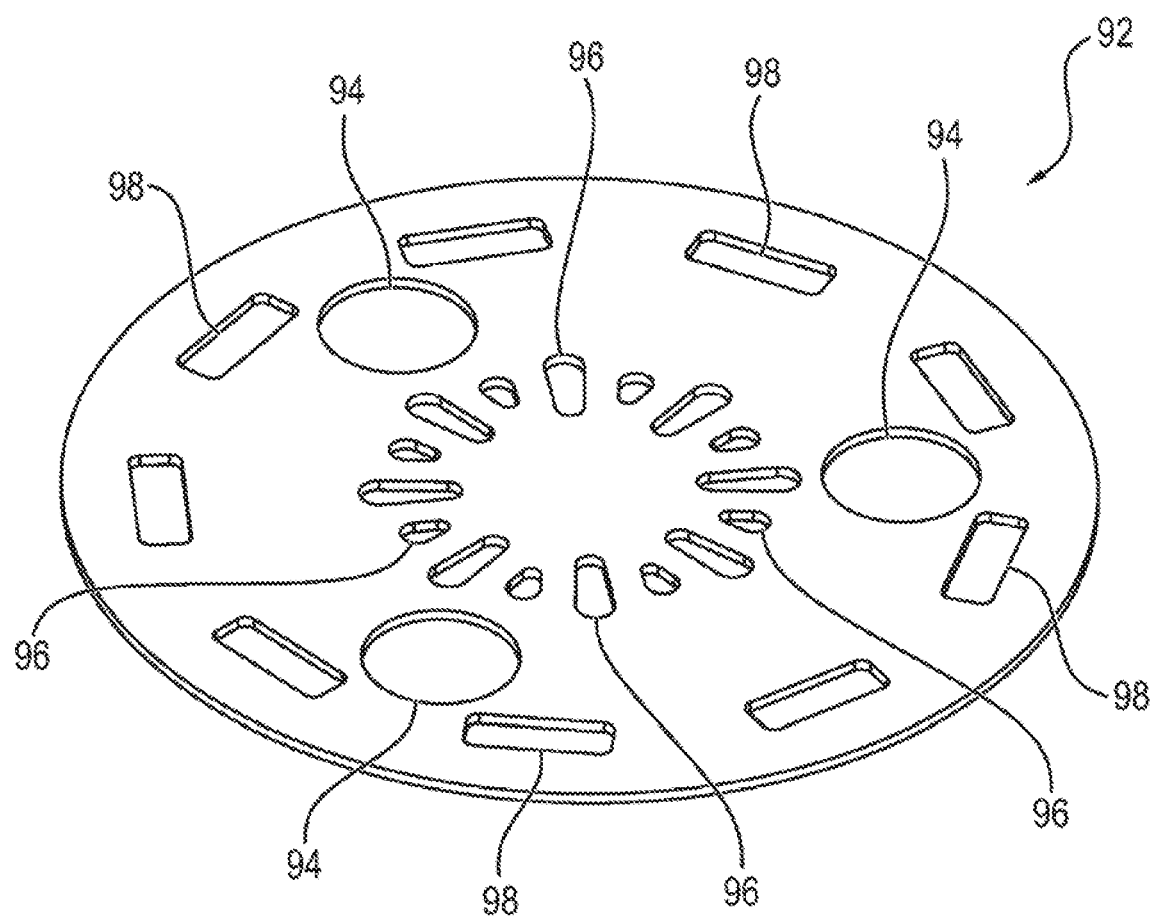
FIG. 10 shows, in perspective, a disk-type hub cover.
Figure 11:
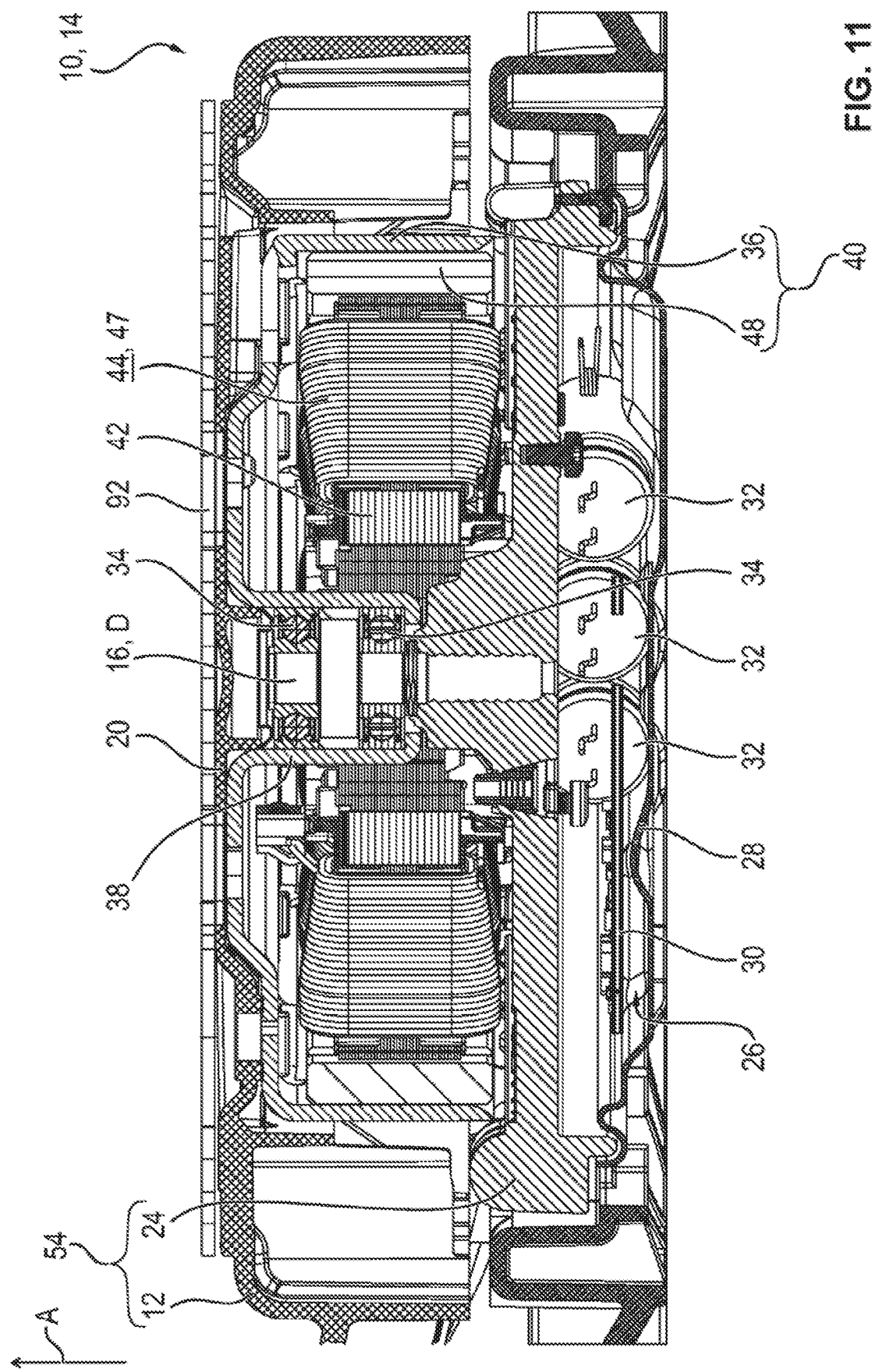
FIG. 11 shows a sectional illustration of the electric drive with the hub cover.

FIGS. 1, 10 and 11 show a hub cover as a cover part 92. The hub cover 92 is manufactured from an electrically conductive material and, in the assembled condition (FIG. 1 and FIG. 11), is mounted on the end of the hub 20 of the fan impeller 12 or secured thereon.

The approximately disk-shaped hub cover 92 has three round holes 94 distributed uniformly along the circumferential or azimuthal direction. In the assembled or fitted condition, the round holes 94 are in alignment with corresponding fastening holes in the hub 20, by means of which the hub 20 is coupled to the rotor 40 for conjoint rotation therewith. The hub cover 92—similarly to the rotor cover 52—furthermore has a number of ventilation openings 96, provided with reference signs purely by way of example, which are introduced in the disk center of the hub cover 92. Moreover, a number of approximately rectangular apertures 98 corresponding to the number of blades 18 is introduced into the hub cover 92 in the regions of the outer circumference, along a circumferential or azimuthal direction. In the figures, purely by way of example, the apertures 98 are provided with reference signs.

As can be seen especially in the sectional illustration in FIG. 11, the motor housing 54 of the electric motor 14 is formed substantially by the motor support 24 and the impeller 12.

Figure 12:
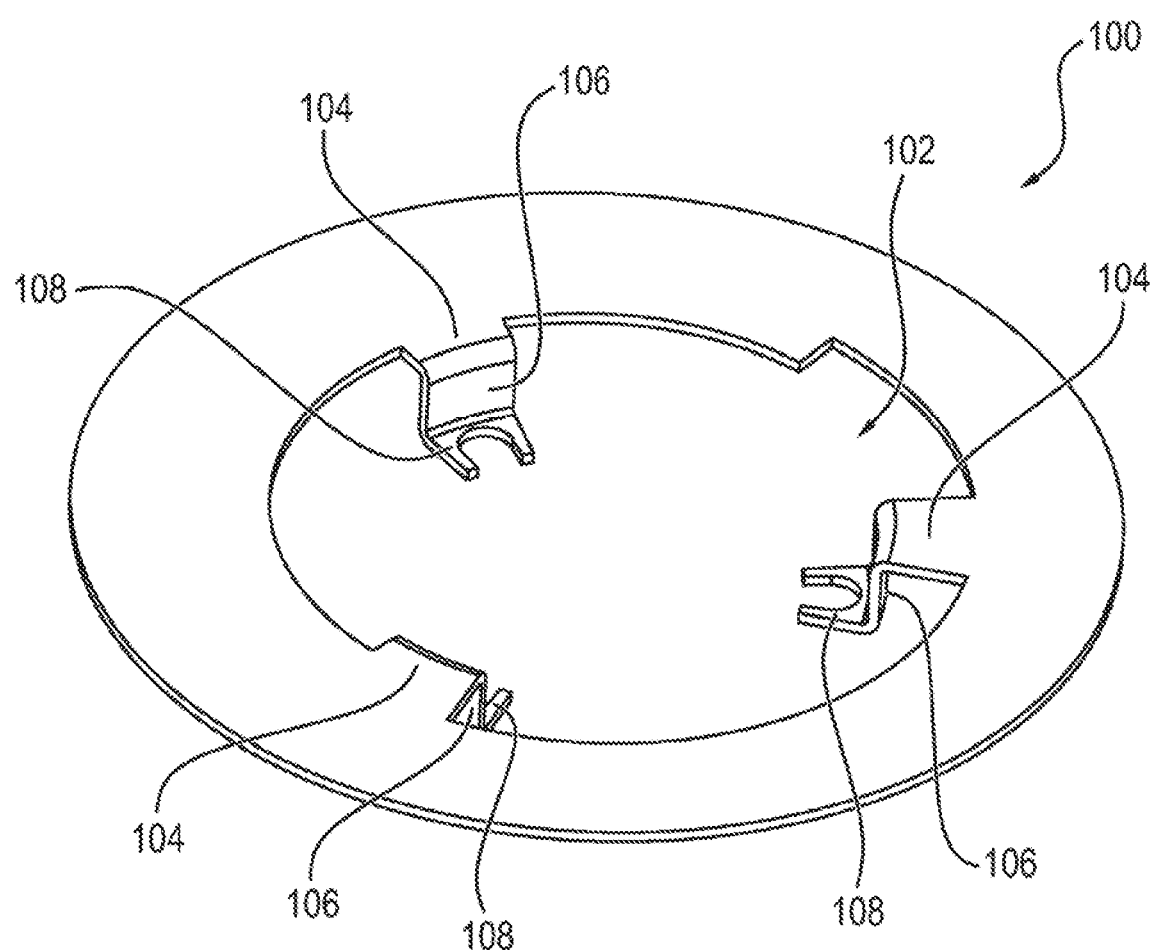
FIG. 12 shows a stator cover in perspective.

A stator cover as a cover part 100 is explained in greater detail below by means of FIG. 12 and FIG. 13. The stator cover 100 is embodied as a stamped and bent part composed of an electrically conductive material for improving the EMC of the drive 10, for example.

In the assembled condition—as can be seen in FIG. 13—the approximately annular stator cover 100 at least partially covers the rotating-field winding 44 of the stator 42 at the end. Three radially inward-projecting angled tabs 104 are formed integrally in the region of a central annular opening 102. The angled tabs 104 each have a step-type axial bend or an offset 106. The angled tabs 104 furthermore have a fork-type socket 108 at the respective free ends thereof. As can be seen in FIG. 13, the angled tabs 104 are secured by means of the sockets 108 on the fastening screws 50 of the stator 42, which are fixed relative to the motor support, with the result that the stator cover 100 is coupled in a mechanically rigid manner to the stator 42.

FIGS. 14 to 17 illustrate a sleeve-type or sleeve-shaped cover part 110 for an electric motor 14 embodied as an internal-rotor motor. The cover part 110, which is also referred to below as a stator sleeve, has a (sleeve, stator) shell 112, which is mounted on the outer circumference of the stator 42' in the assembled condition.

The stator 42' is formed substantially by an annular (stator) core assembly 114, in particular a punch-stacked core assembly, having twelve (stator) teeth 46' arranged in a star shape and oriented radially inward. The stator teeth 46' are provided with the multiphase rotating-field winding 44', and each phase may include at least one coil or coil winding (phase winding) 47', which has a first and a second coil end. In this case, the coils 47' are each arranged, in particular, as individual coils on one stator tooth 46'. As an alternative, double or multiple coils, the coil winding of which is mounted on two or more stator teeth 46', are also conceivable.

To install, contact and interconnect the coil ends with the rotating-field winding 44', an annular contact device in the form of installation or interconnection rings 116, 118 mounted on the end of the core assembly 114 is provided, for example.

The interconnection rings 116, 118 are mounted in pairs on the ends of the core assembly 114 and each have sleeve-type receptacles for the stator teeth 46', with the result that the stator teeth 46' are surrounded substantially by insulating coil or winding formers by virtue of the sleeve-type receptacles of the interconnection rings 116, 118. The coil formers have groove-type depressions for guiding the winding wires and flange-type side walls 120 for avoiding a (radial) detachment of the finished coil 116 from the stator tooth 46', for example.

The interconnection ring 116 has a termination 122, which projects axially beyond the core assembly 114 as a segmented annular wall. By means of the termination 122, the winding wires can be guided circumferentially from stator tooth to stator tooth, behind the stator teeth 46', in a winding process, thus ensuring that the winding wires do not collide with the winding tool.

The stator sleeve 110 is mounted on the interconnection ring 116. In this case, the stator sleeve 110 has twelve cover tabs 124, which are bent radially inward from the shell 112. In this arrangement, the cover tabs 124 each fit over or conceal one of the coils 47', and the termination 122 engages in the gaps between two respectively adjacent cover tabs 124 as an anti-rotation safeguard.

Twenty-four beads 128, two for each cover tab 124, distributed over the circumference, which project radially into the opening in the stator sleeve 110 on the shell inner surface facing the stator 42', are introduced into the shell outer surface 126 of the shell 74 which faces away from the stator 42'. The beads 128 serve to compensate for the radial clearance or for radial tolerance compensation between the stator sleeve 110 and the outer circumference of the stator 42'.

Figure 16:
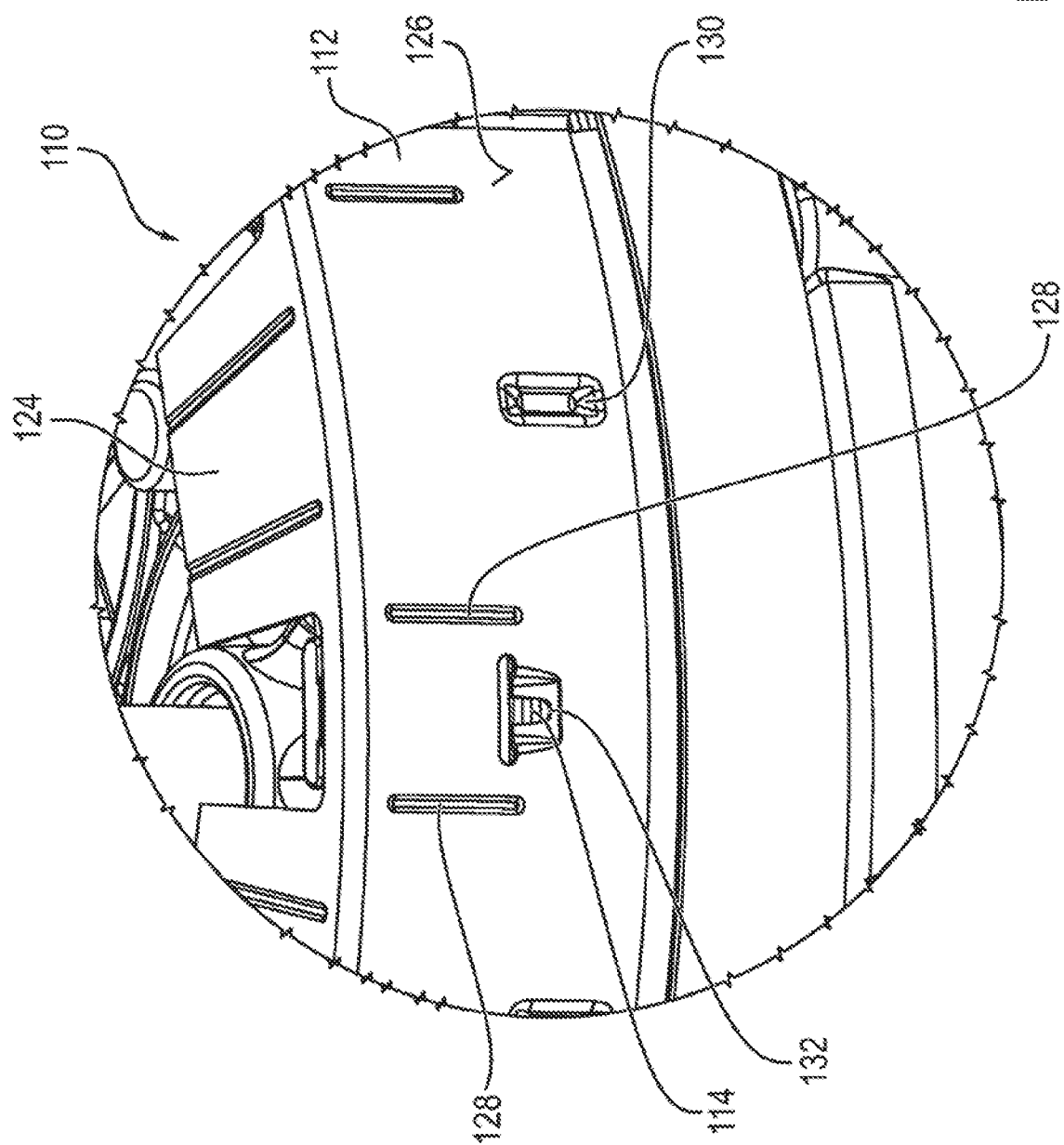
FIG. 16 shows a segment of the stator shell.
Figure 17:
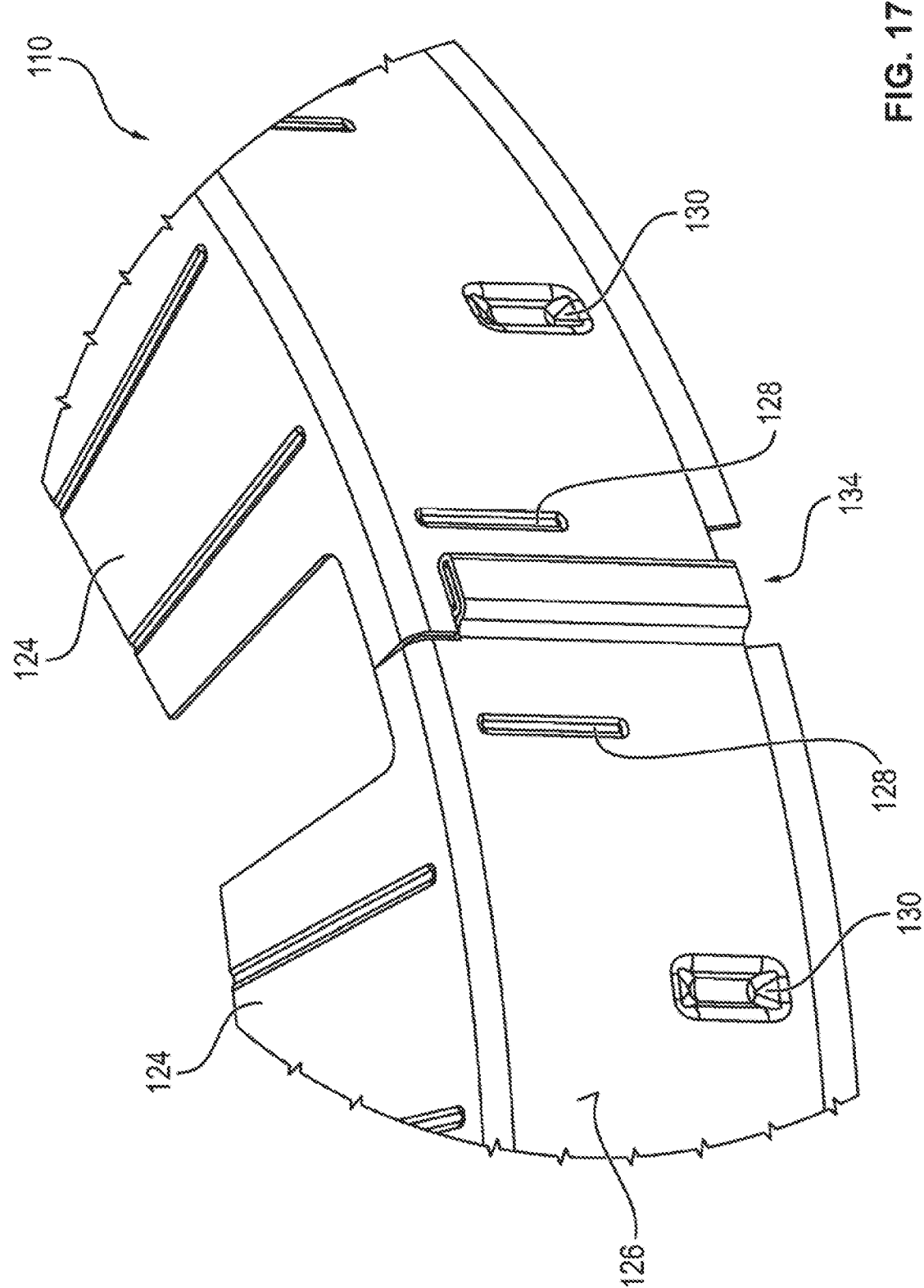
FIG. 17 shows a segment of a joint in the stator shell.

A bead-type contact element 130 is formed integrally in the shell 112 between the beads 128 of the respective cover tab 124. In the assembled condition, the contact element 130 is in electrically conductive direct contact with the core assembly 114 (FIG. 16).

In the regions between the cover tabs 124, a respective fixing element 132 in the form of a latching tab is introduced into the shell 112. The fixing elements 132 are used to fix or secure the stator sleeve 110 axially on the stator 42'. For this purpose, the fixing elements 132 fit behind a rim of the interconnection ring 116 in the assembled condition, said rim projecting radially at least partially beyond the core assembly 114. In this case, it is appropriate for this rim to have circumferential apertures for the contact elements 130.

The shell 112 of the stator sleeve 110 is formed from a rolled or bent strip-shaped sheet-metal part, and the opposite ends of the sheet-metal part are joined together at a joint 134 to form the annular shell 112. As is clear especially in FIG. 17, the front end regions of the sheet-metal part are in this case joined together by means of a forming process to form the joint 134.

The invention is not restricted to the illustrative embodiments described above. On the contrary, other variants of the invention can be derived therefrom by a person skilled in the art without exceeding the subject matter of the invention. In particular, all the individual features described in conjunction with the illustrative embodiments can also be combined in different ways without exceeding the subject matter of the invention.

Thus, for example, it is conceivable to use just one of the cover parts 52, 72, 92, 100 or 110 to improve the EMC of the drive 10. However, a plurality of cover parts, such as all four cover parts 52, 72, 92 and 100, are used jointly in a drive 10 provided with an external-rotor motor, and the shell 74 of the cover part 72 forms the shell 58 of the cover part 52, for example. In the case of an internal-rotor motor, a combined use of the cover parts 92 and 110 is conceivable, for example. It is essential that interception, damping, diversion and/or attenuation of the electromagnetic interference fields of the drive 10 which occur during the operation of the electric motor are brought about by means of one or of each of the electrically conductive cover parts 52, 72, 92, 100, 110. A particularly effective drive 10 with particularly suitable EMC is thereby achieved.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS 2 radiator cowl
4 cowl body
6 fan/fan device
8 aperture
10 drive
12 drive part/fan impeller
14 electric motor
16 motor axis
18 fan impeller
20 hub
22 upper side
24 motor support
26 motor electronics
28 electronic housing
30 inverter circuit
32 choke
34 rolling bearing
36 return pot
38 bearing receptacle
40 rotor
42, 42' stator
44, 44' rotating-field winding
46; 46' stator tooth
47, 47' coil/individual coil
48 permanent magnet
50 fastening screw
52 rotor cover/cover part
54 motor housing
56 pot base
58 pot shell/shell
60 annular region
62 radial strut/strut
64 annular opening
66 ventilation opening
68 ventilation opening
70 fastening hole
72 rotor sleeve/cover part
74 shell/sleeve shell
76 seam
78 shell outer surface
80 shell inner surface
84 collar
86 retaining tabs
88 fastening opening
90 retaining rim
92 hub cover/cover part
94 round hole
96 ventilation opening
98 aperture
100 stator cover/cover part
102 annular opening
104 angled tab
106 bend/offset
108 socket
110 cover part/stator sleeve
112 shell
114 core assembly
116, 118 interconnection ring
120 side wall
122 termination
124 cover tab
126 shell outer surface
128 bead
130 contact element
132 fixing element
134 joint
A axial direction
D axis of rotation While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An electric drive for a motor vehicle comprising:
   an electric motor including
   a stationary stator,
   a rotor configured to rotate relative to the stationary stator about an axis of rotation, the rotor configured to be coupled to a drive part in a non-rotatable manner, wherein the rotor is formed by a recoil pot provided with an inner circumference, an outer circumference, an end face, and permanent magnets disposed circumferentially about the inner circumference, and a motor housing, wherein the motor housing at least partially accommodates the stator and/or the rotor; and an electrically conductive cover part configured to influence and/or block electromagnetic interference fields generated during operation of the electric motor, wherein the cover part forms a rotor sleeve provided with a sleeve-like shell, wherein in an assembled state, the cover part is disposed on the outer circumference of the rotor, wherein the sleeve-like shell includes an outer surface, facing away from the rotor, and a number of beads extending radially inward from the outer surface of the sleeve-like shell, the number of beads circumferentially disposed about the inner surface of the sleeve-like shell and configured to compensate for a radial clearance between the electrically conductive cover part and the outer circumference of the recoil pot, wherein the sleeve-like shell includes an end face, an upper collar, and a number of retaining lugs, the end face configured to face the drive part in the assembled state, the upper collar arranged on the end face, the number of retaining lugs disposed circumferentially about the upper collar and bent radially inwards, wherein the number of retaining lugs are configured to provide non-rotatable attachment of the electrically conductive cover part to the end face of the recoil pot.

2. The electric drive of claim 1, wherein the cover part is mounted to and in direct contact with the motor housing.

3. The electric drive of claim 1, wherein the electrically conductive cover part has a pot base at one end, joined to the sleeve like shell, wherein the rotor is inserted at least partially into the electrically conductive cover part.

4. The electric drive of claim 1, wherein the sleeve-type shell is at least substantially annular wherein one end of the sleeve like shell at least partially covers a rotating-field winding of the stator.

5. The electric drive of claim 4, wherein the electrically conductive cover part—includes angled tabs integrally formed and extending radially inward from a periphery of a central annular opening defined by the cover part.

6. The electric drive of claim 5, wherein the angled tabs are secured to the stator.

7. The electric drive of claim 1, wherein the electrically conductive cover part is inserted into the motor housing.

8. A fan device for use in a motor vehicle, the fan device comprising:
a fan impeller including a hub;
an electric motor including
a stationary stator,
a rotor coupled to the hub and configured to rotate relative to the stator about an axis of rotation to rotate the fan impeller, the rotor formed by a recoil pot provided with an inner circumference, an outer circumference, an end face, and permanent magnets disposed circumferentially about the inner circumference and
a motor housing, wherein the motor housing at least partially accommodates the stator and/or the rotor; and
a rotor sleeve formed of an electrically conductive material configured to influence and/or block electromagnetic interference fields generated during operation of the electric motor, the rotor sleeve disposed on the outer circumference of the rotor and mounted to the hub, wherein the rotor sleeve includes a number of beads formed on an outer surface of the rotor sleeve, facing away from the rotor, and radially inwardly extending towards the recoil pot, the number of beads are collectively configured to compensate for a radial clearance between the rotor sleeve and the outer circumference of the recoil pot, wherein the rotor sleeve includes a number of retaining lugs bent radially inward from an upper portion of the rotor sleeve, the number of retaining lugs are configured to provide non-rotatable attachment of the rotor sleeve to the end face of the recoil pot.

9. The electric drive of claim 1, wherein the electrically conductive cover part is formed separately from the stationary stator, rotor, and motor housing.

10. The electric drive of claim 5, wherein the angled tabs are angled axially.

11. The fan device of claim 8, wherein the rotor sleeve has a substantially annular shape.

12. An electric drive comprising:
an electric motor including a stator, a rotor, and a motor housing, wherein the rotor may be configured to rotate with respect to the stator or vice-versa and the motor housing receives at least portions of the stator and the rotor, wherein the rotor is formed by a recoil pot provided with an inner circumference, an outer circumference, an end face, and permanent magnets disposed circumferentially about the inner circumference; and
a cover formed of an electrically conductive material configured to mitigate electromagnetic interference fields generated during the operation of the electric motor, wherein the cover includes,
an annular sleeve including an inner surface and an outer surface, and
a retaining rim radially extending away from the outer surface of the annular sleeve, wherein the annular sleeve includes number of beads each radially and inwardly extending from the outer surface towards the recoil pot and configured to compensate for a radial clearance between the cover part and the recoil pot.

13. The electric drive of claim 12, further comprising a fan and a hub, wherein the cover is fixed to the hub.

14. The electric drive of claim 13, further comprising a pot base concentrically arranged and axially offset from the retaining rim.

15. The electric drive of claim 14, further comprising a strut radially extending from the retaining rim to the pot base.

16. The electric drive of claim 15, wherein the strut extends at least partially axially from the retaining rim.

17. The electric drive of claim 14, wherein the pot base defines a plurality of elongated apertures.

18. The electric drive of claim 12, wherein the annular sleeve includes a second number of beads and a contact element extending from the inner surface and disposed between the first number of beads and the second number of beads, wherein the contact element has a convex shape with respect to the inner surface and is configured to electrically contact the rotor or the stator.

19. The electric drive of claim 1, wherein at least one of the number of retaining lugs defines an opening configured to receive a fastener to fix the sleeve like shell to the recoil pot.

* * * * *